United States Patent [19]
Misawa

[11] Patent Number: 5,623,711
[45] Date of Patent: Apr. 22, 1997

[54] CAMERA HAVING SHUTTER BLOCK WITH GUIDE RAILS

[75] Inventor: Masayuki Misawa, Tokyo, Japan

[73] Assignee: Asahi Kogaku Kogyo Kabushiki Kaisha, Tokyo, Japan

[21] Appl. No.: 583,550

[22] Filed: Jan. 5, 1996

[30] Foreign Application Priority Data

Jan. 12, 1995 [JP] Japan ..................... 7-019778

[51] Int. Cl.$^6$ ............... G03B 17/02; G03B 19/12
[52] U.S. Cl. ............... 396/357; 396/486; 396/535
[58] Field of Search ............... 354/152, 226, 354/246, 288; 396/354, 357, 452, 484–488, 535, 541

[56] References Cited

U.S. PATENT DOCUMENTS

| | | | |
|---|---|---|---|
| 4,067,032 | 1/1978 | Yoshikawa et al. | 354/288 |
| 4,819,017 | 4/1989 | Nemoto et al. | 354/288 |
| 5,166,716 | 11/1992 | Kawano | 354/195.1 |
| 5,245,476 | 9/1993 | Shono | 359/699 |

*Primary Examiner*—Safet Metjahic
*Assistant Examiner*—J. K. Han
*Attorney, Agent, or Firm*—Greenblum & Bernstein P.L.C.

[57] ABSTRACT

Guide rails for positioning a film are formed on a shutter block. The guide rails project through an opening in a thin back plate of a camera body to regulate the position of a film drawn from a film cartridge chamber into a spool chamber. A frame aperture formed in the shutter block regulates the exposable area of a frame of film. The shutter block is fixable to a box-shaped mirror housing, which is then fixed to the camera body and a supporting plate.

25 Claims, 6 Drawing Sheets

CAMERA HAVING SHUTTER BLOCK WITH GUIDE RAILS

BACKGROUND OF THE INVENTION

The present invention relates to structures within a camera, and more specifically, to the internal structural arrangement of a single lens reflex (SLR) camera.

Generally, SLR cameras have at least one internal skeleton or chassis. One such chassis is commonly known as a camera body, and is a unitarily formed structure that includes a cartridge chamber, a spool chamber, and a rear plate having guide rails with an aperture frame formed therein. Usually, the camera body is made of diecast aluminum or another metal, in order to provide sufficient rigidity to maintain optical alignments and to help support large lenses. However, when the camera body is formed from metal, the camera is heavy.

Recently, the performance of engineering plastics has improved, and these plastics have gradually been used to form more parts in camera assemblies. However, the camera body usually remains metal, as it bears significant mechanical loads and provides important reference surfaces for alignment.

Figure 1:
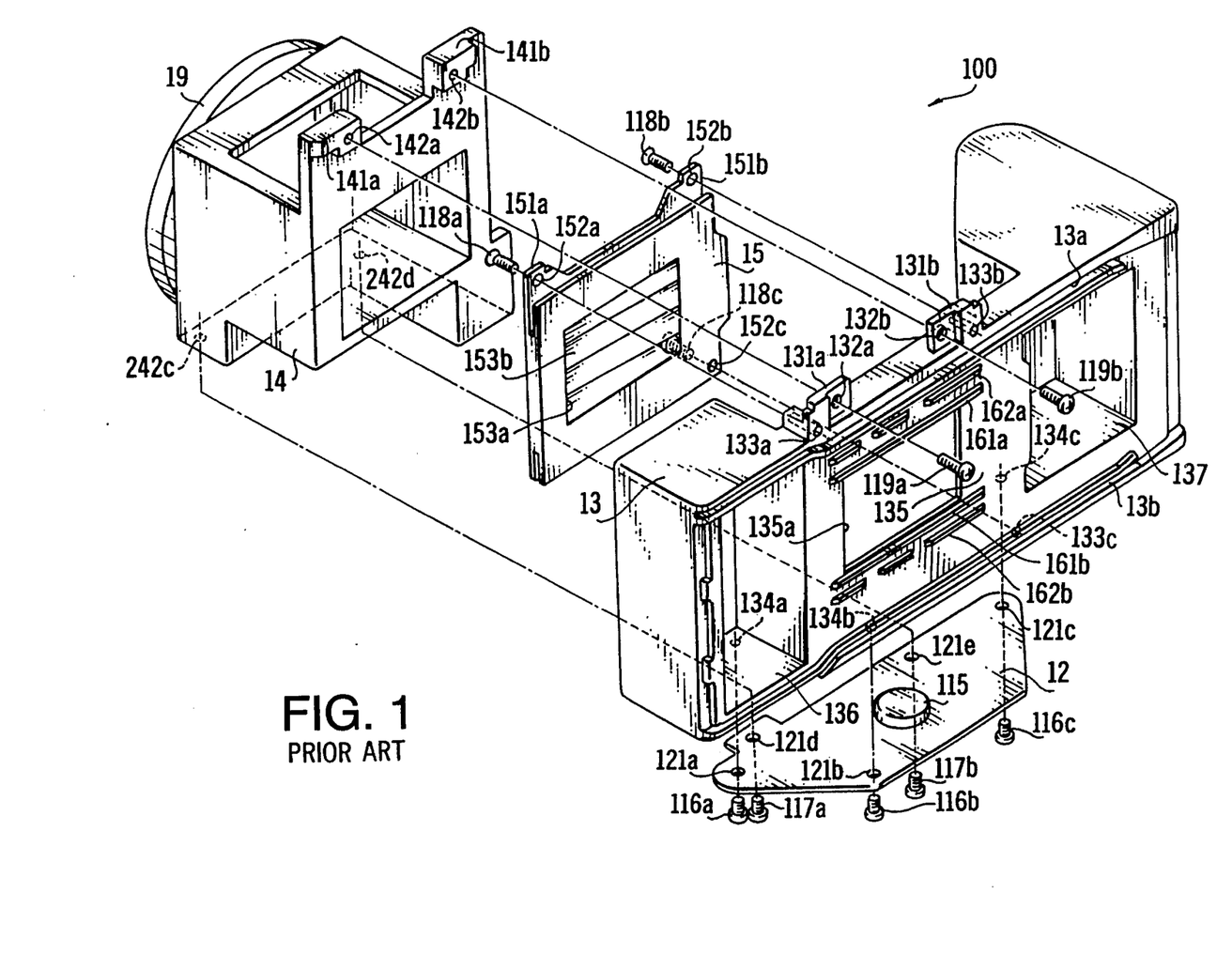
FIG. 1 is an exploded view of the main structural members of a conventional camera.
Figure 2:
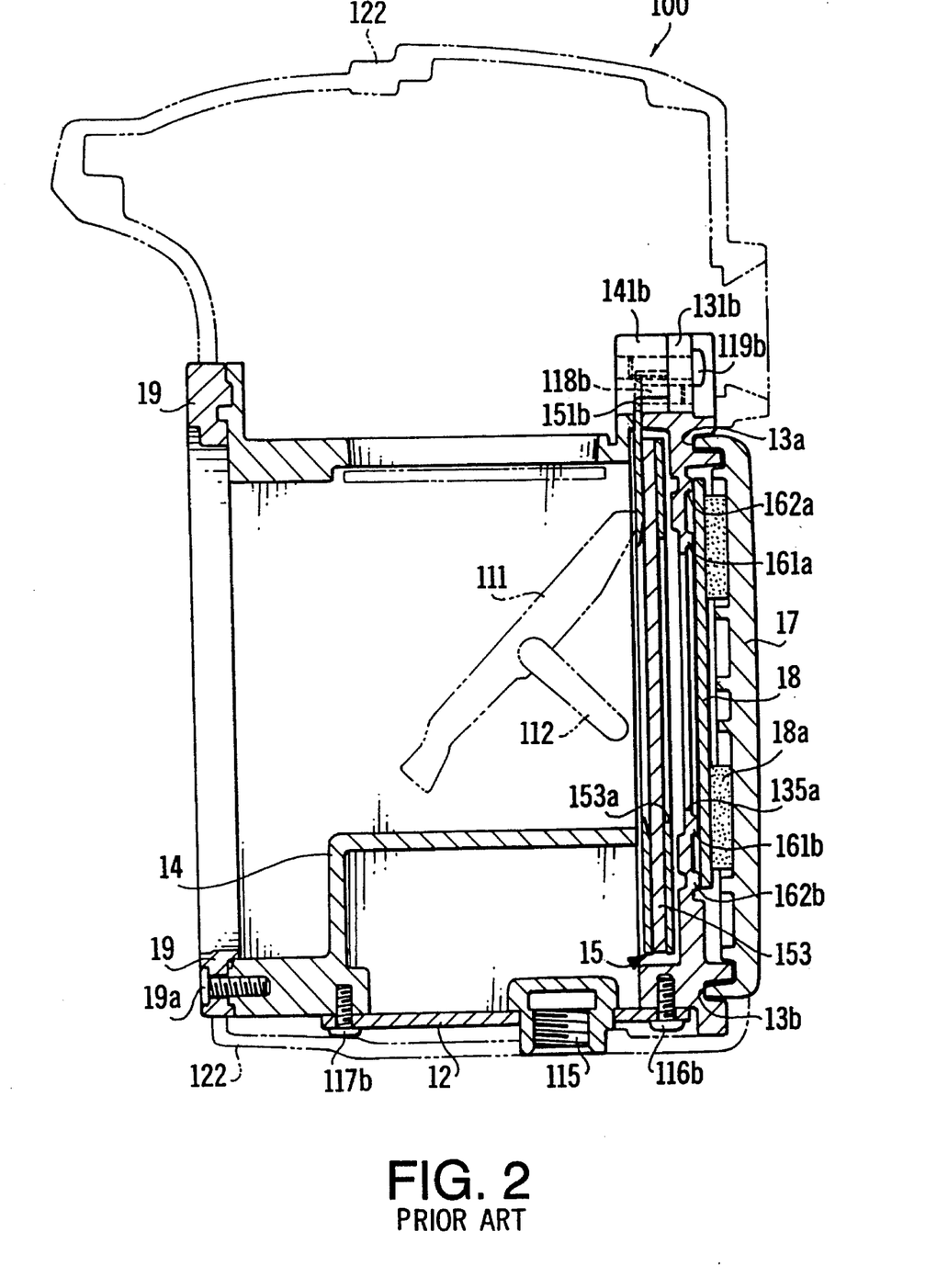
FIG. 2 is a side sectional view of the conventional camera.

FIG. 1 shows an exploded view of internal parts of a conventional SLR camera 100, while FIG. 2 shows a side sectional view of the conventional camera 100 as assembled. As shown in FIG. 1, the main structural members of the conventional camera 100 are a camera body 13, a supporting plate 12, a shutter block 15, and a mirror box 14.

The supporting plate 12 is secured to the bottom of the camera body 13 by screws 116a, 116b, and 116c, via holes 121a, 121b, and 121c of the supporting plate and threaded holes 134a, 134b, and 134c of the camera body 13, respectively. The shutter block 15 has mounting tabs 151a, 151b formed at a top portion thereof, and is secured (via holes 152a, 152b in the mounting tabs and threaded holes 133a, 133b in the camera body) to the upper portion of the camera body 13 by screws 118a, 118b. Further, the shutter block 15 is secured to the lower portion of the camera body by a screw 118c, via a hole 152c in the shutter block and a threaded hole 133c in the camera body 13.

As illustrated in FIGS. 1 and 2, the shutter block 15 comprises front and rear shutter frames, shutter blades 153b, a blade chamber 153 wherein the shutter blades 153b are accommodated, and a driving mechanism (not shown) for driving the blades 153b. The blade chamber 153 is provided between the shutter frames. The shutter block 15 carries out exposure control by driving the shutter blades 153b when taking a photograph. An opening 153a is formed in the rear of the shutter block 15 to allow light to pass to the film, and a corresponding opening is formed in the front of the shutter block 15.

The camera body 13 has top mounting blocks 131a, 131b integrally formed therein, while the mirror housing 14 has matching mounting blocks 141a, 141b integrally formed therein. The mirror housing 14 is secured to the top portion of the camera body 13 (over the shutter block 15) by screws 119a, 119b, via holes 132a, 132b in the top mounting blocks 131a, 131b and threaded holes 142a, 142b in the matching mounting blocks 141a, 141b, respectively. The bottom of the mirror housing 14 is secured to the supporting plate 12 by screws 117a, 117b, passing via holes 121d, 121e in the supporting plate and threaded holes 142c, 142d in the mirror housing. A threaded tripod socket 115 for engaging a tripod or other supporting device is provided on the supporting plate 12.

The camera body 13 of the conventional camera is formed with a cartridge chamber 136, a spool chamber 137, and a thin back plate 135 between the two chambers 136 and 137. An aperture frame 135a, which defines the exposable area of a film in the camera, is formed in the back plate 135. Film is loaded in the finally assembled conventional camera by placing a film cartridge, in the cartridge chamber 136 and drawing the film across the aperture frame 135a to a winding spool (not shown) in the spool chamber 137.

To stabilize the position and transport of the film, the thin back plate 135 of the conventional camera body 13 is provided with a pair of integrally formed inner rails 161a, 161b and a pair of integrally formed outer rails 162a, 162b. During photography and film transport, the film is flattened against the inner rails 161a, 161b and guided between the outer rails 162a, 162b.

Decorative cover portions 122, shown by a phantom line in FIG. 2, are provided on the top, front and bottom of the camera 100. As shown in FIGS. 1 and 2, a body side bayonet mount 19 is provided on the front (the photographing lens side) of the camera 100, and is secured to the mirror housing 14 by a screw 19a. A lens side bayonet mount is provided on the lens barrel of a compatible photographing lens (not shown), and is mountable to the body side mount 19.

A quick return mirror, including a main mirror 111 and a sub mirror 112 (shown by phantom lines in FIG. 2) is accommodated in the mirror housing 14. The quick return mirror is swingably supported by the mirror housing 14 to swing between a photographing position and a observing position. The position illustrated by phantom lines in FIG. 2 is the observing position, where incident light is divided by the main mirror 111 into reflected light and passing light. The reflected light is directed upwards to a focusing screen, pentamirror, and finder (not shown). The passing light is reflected by the submirror 112 to an autofocus detection system (not shown). The quick return mirror moves to its photographing position when a release switch (not shown) is turned ON. To reach the photographing position, the main mirror 111 and submirror 112 are flipped up parallel to the focusing screen, and incident light passes to the shutter block 15. Subsequently, the shutter block 15 is activated to carry out the exposure onto a film.

As shown in FIG. 2, a back lid 17 is closable to the rear of the camera body 13. Grooves 13a and 13b are provided at the rear side of the camera body 13 to accept the upper and lower rims of the back lid 17 when the back lid 17 is shut, shielding the back of the camera 100 against the intrusion of light. On the inner side of the back lid 17 (inside the camera 100 when the back lid 17 is closed), a pressing plate 18 is resiliently supported by supports 18a for pressing the film into a position against the inner rails 161a, 161b and between the outer rails 162a, 162b.

The thin back plate 135 can be affected by externally applied stresses, which is one reason why the camera body 13 is conventionally made of metal. If the thin back plate 135 is distorted by an externally applied stress, the aperture frame 135a, and the rails 161a, 161b, 162a, and 162b are consequently distorted, adversely affecting the image quality.

When the conventional camera 100 is attached to a tripod, a large externally applied bending force can directly transmit from the tripod socket 115 through, for example, the screw 116b to the thin back plate 135. This can cause the back plate 135 to warp, making the film flatness (controlled by the inner rails 161a, 161b), position (controlled by the outer rails 162a, 162b), and image shape (controlled by the aperture frame 135a) poor.

A body thus fabricated as the conventional camera body 13, having the inner rails 161a, 161b and outer rails 162a, 162b, and frame aperture 135a formed in the thin back plate 135, is sensitive to externally applied forces. Furthermore, if the camera body is made of plastic, the conventional camera structure as described, including the camera body 13, supporting plate 12, shutter block 15, and mirror housing 14, then the camera would be even more subject to distortion when external forces are applied.

SUMMARY OF THE INVENTION

It is therefore an object of the present invention to provide an improved camera capable of preventing deformation of rails for film positioning and a frame aperture when external stresses are applied to the camera body.

In order to accomplish the objects of the invention, a camera includes a camera body having a plate extending between a film cartridge chamber and a spool chamber. The plate has an opening formed therein. A box-shaped mirror housing for supporting a swingable mirror is secured to the camera body. A shutter block with a frame aperture formed therein defines an exposable area of a frame of film. At least one pair of guide rails for positioning the film are also provided. The shutter block is secured to one of the mirror housing and the camera body, and the frame aperture and the guide rails are positioned within the opening formed in the plate.

Accordingly, the aperture frame and guide rails are able to resist external distorting stresses, as they are not formed directly on the camera body. Furthermore, film inserted in the camera is positioned by members formed on the shutter block while the largest exposable frame area is defined by the frame aperture provided to the shutter block. Neither guiding members nor an aperture frame thus need be formed in the camera body.

Preferably, the shutter block is secured to the mirror housing, isolating the guide rails and frame aperture from external forces applied to the camera body. In the alternative, the camera body is formed from plastic resin, since camera body strength is not required to resist the transmission of distorting forces to the aperture frame and guide rails.

The camera further preferably includes a supporting plate secured to both the camera body and the mirror housing. The supporting plate may have a threaded tripod socket formed therein for attaching a tripod to the camera. If a distorting force is applied to the camera through the tripod socket, it is not directly transmitted to the aperture frame and guide rails.

According to another aspect of the invention, a camera includes a camera body having a rear plate extending between a film cartridge chamber and a spool chamber, and having an opening formed therein. A focal plane shutter block is provided and has a film guiding plate extending into the opening. The film guiding plate is substantially the same size as the opening and has a surface substantially flush with the rear plate. The film guiding plate includes a frame aperture formed therein for defining an exposable area of a frame of film, an inner pair of guide rails for flattening a film inserted in the camera, and an outer pair of guide rails for guiding the film therebetween.

In this manner, a film inserted in the camera is positioned by the guide rails formed on the shutter block while the largest exposable frame area is defined by the frame aperture provided to the shutter block. The two functions are performed without any specific members formed in the camera body itself.

According to still another aspect of the invention, a focal plane shutter block for a camera includes a focal plane shutter, and a rear frame plate upon which a film guiding plate is formed. The film guiding plate includes an inner pair of guide rails extending in a direction of film travel past the shutter block, contacting a face of the film and flattening the film, an outer pair of guide rails extending in a direction of film travel past the shutter block, contacting edges of the film and guiding the film therebetween, and a frame aperture formed in the film guiding plate between the inner pair of guide rails, for defining a largest exposable area of a frame of film used in the camera.

According to still yet another aspect of the invention, a camera includes a camera body having a plate extending between a film cartridge chamber and a spool chamber. The plate has an opening formed therein. A shutter block has a frame aperture formed therein for defining an exposable area of a frame of film. At least one pair of guide rails for positioning the film is provided. The shutter block is secured with reference to the camera body, and the frame aperture and the guide rails are positioned within the opening formed in the plate.

In these developments of the invention, the focal plane shutter block serves several functions, including regulating an exposure, guiding the film, flattening the film, and defining the largest exposable frame area of a frame of film. Thus, none of these functions need be performed by other members of a camera, and the number of manufacturing steps and parts is reduced. Furthermore, the guiding, flattening, and frame defining portions of the focal plane shutter block are all relatively isolated from mechanical forces applied to other portions of a camera including the focal plane shutter block according to the invention.

DETAILED DESCRIPTION OF THE PREFERRED EMBODIMENTS

Figure 3:
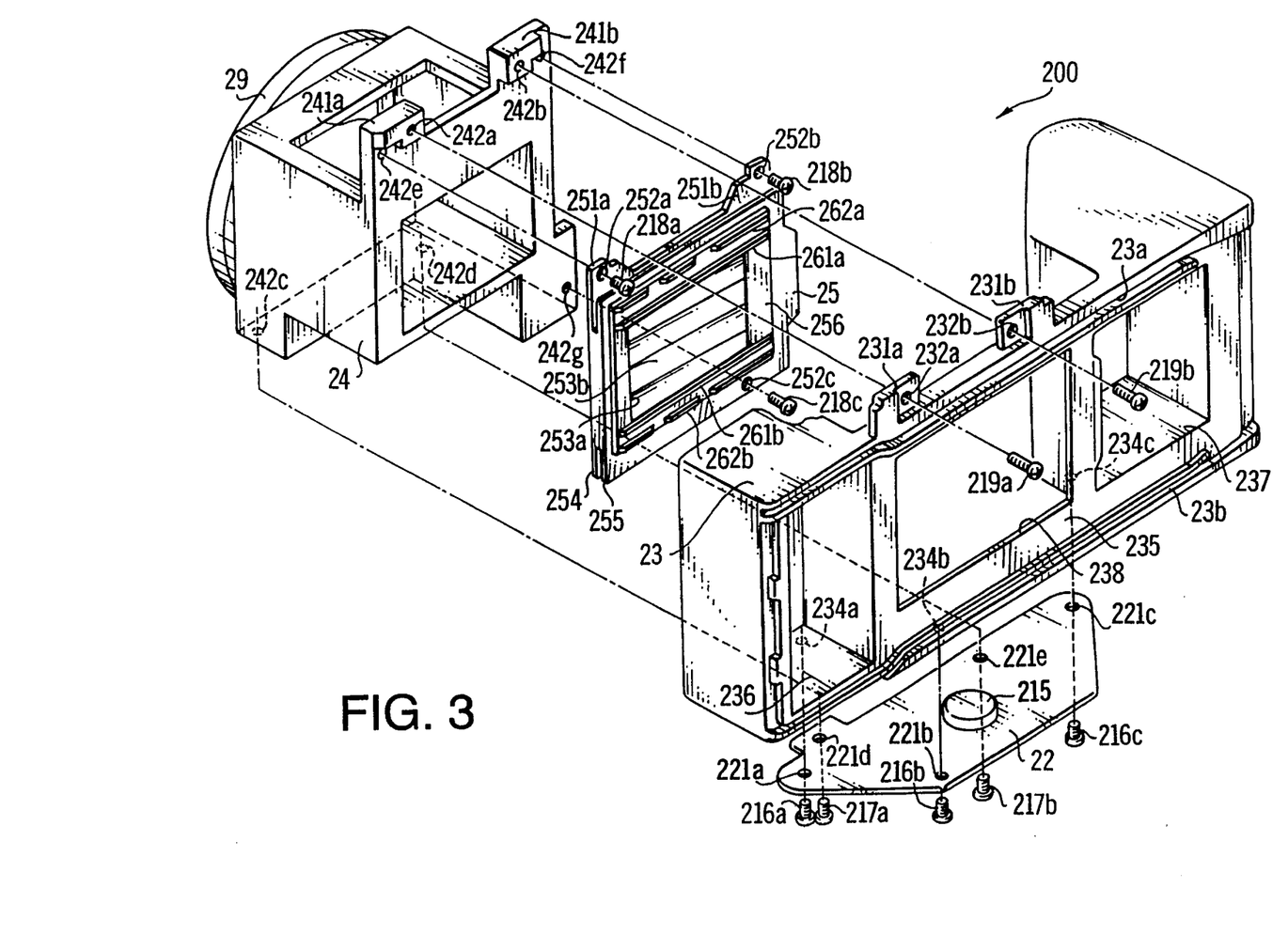
FIG. 3 is an exploded view of the main structural members of an embodiment of a camera according to the invention.
Figure 4:
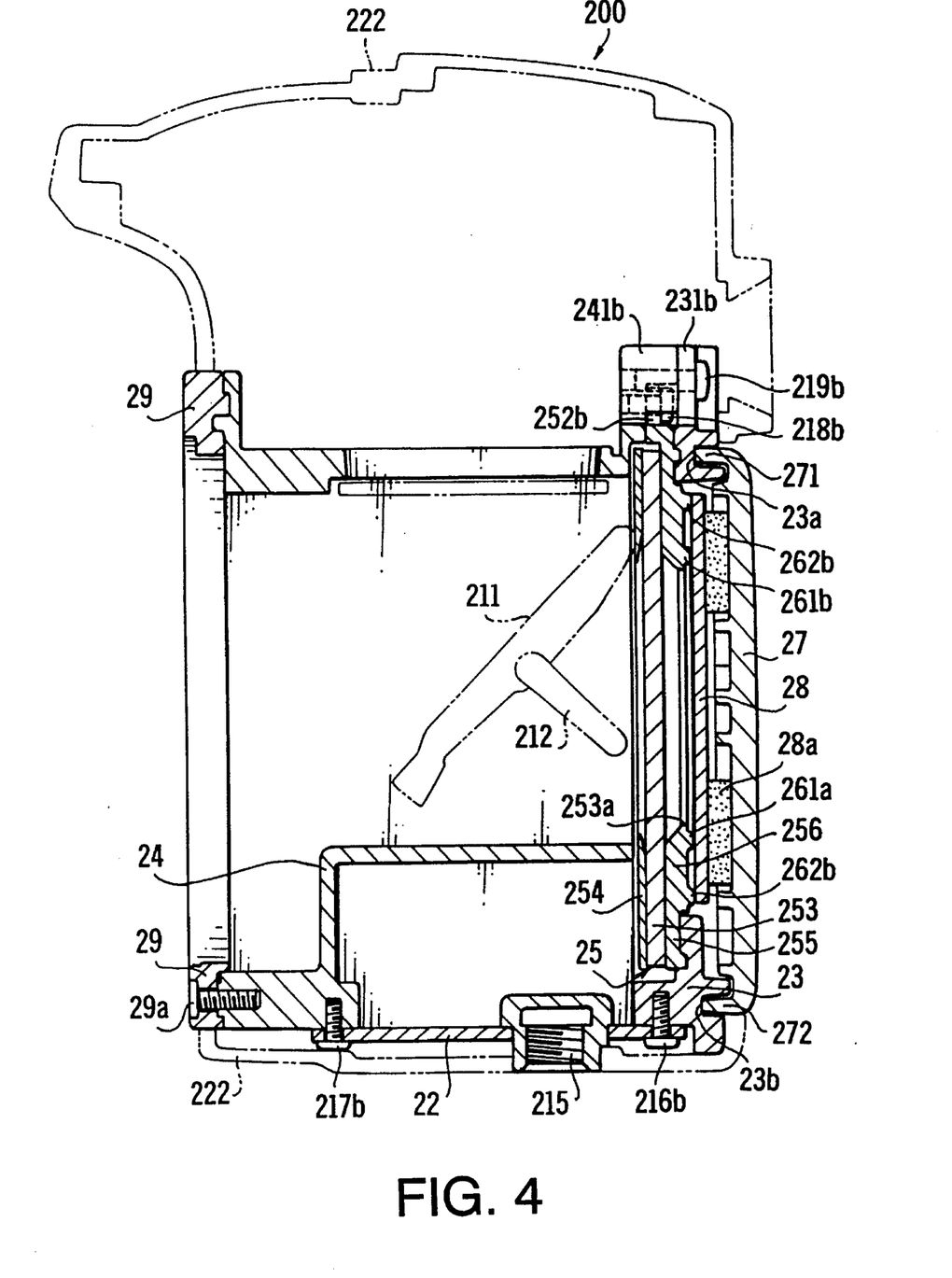
FIG. 4 is a side sectional view of the embodiment of a camera.

The embodiment of a camera 200 according to the invention is an a autofocus through-the-lens (TTL) finder SLR camera. FIG. 3 shows an exploded view of internal parts of an embodiment of the SLR camera 200 according to the invention, while FIG. 4 shows a side sectional view of the embodiment of the camera 200, as assembled. As shown in FIG. 3, the main structural members of the conventional camera are a camera body 23, a supporting plate 22, a shutter block 25, and a mirror housing 24.

The supporting plate 22 is secured to the bottom of the camera body 23 by screws 216a, 216b, and 216c, via holes 221a, 221b, and 221c of the supporting plate and threaded holes 234a, 234b, and 234c of the camera body 23, respectively. The shutter block 25 has mounting tabs 251a, 251b formed at a top portion thereof, and is secured (via holes 252a, 252b in the mounting tabs and threaded holes 242e, 242f in the mirror housing 24) to the upper portion of the mirror housing 24 by screws 218a, 218b. Further, the shutter block 25 is secured to the lower portion of the mirror housing 24 by a screw 218c, via a hole 252c in the shutter block and a threaded hole 242g in the mirror housing.

The camera body 23 has top mounting blocks 231a, 231b integrally formed therein, while the mirror housing 24 has matching mounting blocks 241a, 241b integrally formed therein. The mirror housing 24 is secured to the top portion of the camera body 23 (over the shutter block 25) by screws 219a, 219b, via holes 232a, 232b in the top mounting blocks 231a, 231b and threaded holes 242a, 242b in the matching mounting blocks 241a, 241b, respectively. A threaded tripod socket 215 for engaging a tripod or other supporting device is provided to the supporting plate 22. The screws 216b and 219a, 219b are arranged such that the distance between the tripod socket 215 and the screw 216b (connecting the support plate 22 and camera body 23) is less than the distance between the tripod socket 215 and the screws 219a, 219b (connecting the mirror housing 24 and the upper portion of the camera body 23).

The bottom of the mirror housing 24 is secured to the supporting plate 22 by screws 217a, 217b, passing via holes 221d, 221e in the supporting plate and threaded holes 242c, 242d in the mirror housing. The screws 216b and 217a, 217b are arranged such that the distance between the tripod socket 215 and the screw 216b (connecting the support plate 22 and the camera body 23) is less than the distance between the tripod socket 215 and the screws 217a, 217b (connecting the support plate 22 and the mirror housing 24).

The camera body 23 of the present embodiment of a camera is formed with a cartridge chamber 236, a spool chamber 237, and a thin back plate 235 between the two chambers 236 and 237. A rectangular window 238 is formed in the thin back plate 235, for accepting a rectangular film guiding plate 256 formed on the shutter block 25.

Figure 5:
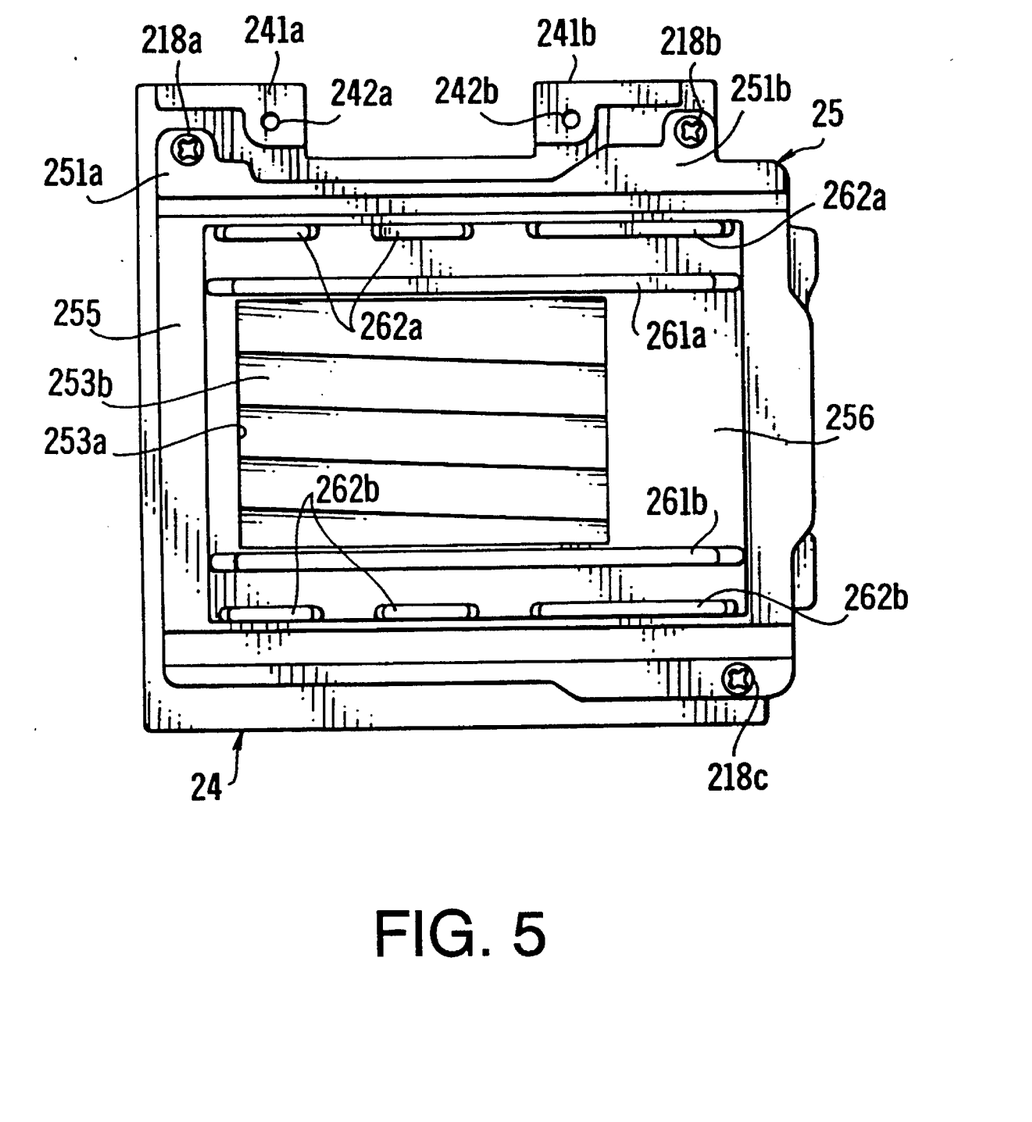
FIG. 5 is a rear view of a shutter block affixed to a mirror housing according to the embodiment.

FIG. 5 is a rear side view showing the shutter block 25 mounted to the mirror housing 24. The film guiding plate 256 is integrally formed on a rear shutter frame 255 of the shutter block 25 of camera 200. The film guiding plate 256 (and rear shutter frame) includes an aperture frame 253a formed therein that defines the exposable area of a frame of film. Furthermore, the film guiding plate 256 of the shutter block 25 is provided with a pair of integrally formed inner rails 261a, 261b and a pair of integrally formed outer rails 262a, 262b, to stabilize the position and transport of the film.

As illustrated in FIGS. 3 and 4, the shutter block 25 comprises front shutter frame 254, rear shutter frame 255, shutter blades 253b, a blade chamber 253 wherein the shutter blades 253b are accommodated, and a driving mechanism (not shown) for driving the blades 253b. The blade chamber 253 is provided between the shutter frames 254 and 255. At least one of the shutter frames 254 and 255 is metal. The shutter block 25 carries out exposure control by driving the shutter blades 253b when taking a photograph. An opening is formed in the front shutter frame 254 corresponding to the aperture frame 253a in the film guiding plate 256. It should be noted that the shutter block 25 is not directly secured to the camera body 23; rather shutter block 25 is secured to the camera body 23 indirectly via the mirror housing 24.

As shown in FIG. 4, the camera is assembled such that the film guiding plate 256 fits in the window 238 of the camera body 23 such that the surface of the film guiding plate 256 and the thin back plate 235 are substantially coplanar. The rails 261a, 261b, 262a and 262b slightly protrude from the coplanar surfaces of plates 256 and 235. Thus, during photography and film transport, the film is flattened against the inner rails 261a, 261b and guided between the outer rails 262a, 262b. The inner rails 261a, 261b regulate the position of the film in forward and backward directions, and the curvature of the film in the direction of its width. The outer rails 262a, 262b regulate the position of the film in the direction of its width while guiding movement of the film.

Figure 6:
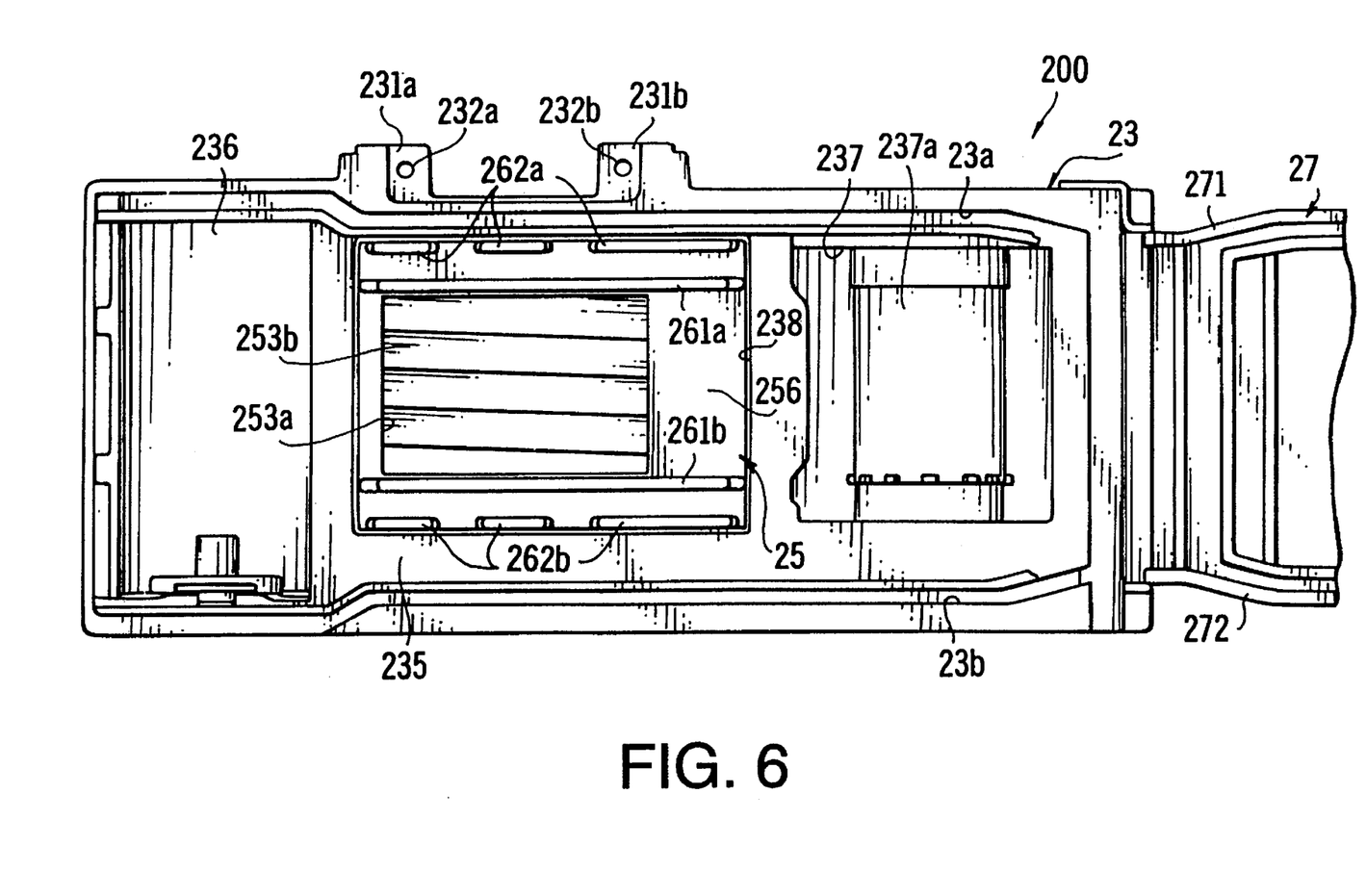
FIG. 6 is a rear view of a camera body of the embodiment, with the shutter block arranged therein.

FIG. 6 is a rear view of the camera body 23 with the shutter block 25 shown in a position assembled thereto. Film is loaded in the camera 200 by placing a film cartridge in the cartridge chamber 236 and drawing the film across the film guiding plate 256 and aperture frame 253a to a winding spool 237a in the spool chamber 237.

Decorative cover portions 222, shown by a phantom line in FIG. 4, are provided on the top, front and bottom of the camera 200. As shown in FIGS. 3 and 4, a body side bayonet mount 29 is provided on the front (the photographing lens side) of the camera 200, and is secured to the mirror housing 24 by a screw 29a. A lens side bayonet mount is provided on the lens barrel of a compatible photographing lens (not shown), and is mountable to the body side mount 29.

A quick return mirror, including a main mirror 211 and a sub mirror 212 (shown by phantom lines in FIG. 4) is accommodated in the mirror housing 24. The quick return mirror is swingably supported by the mirror housing 24 to swing between a photographing position and a observing position. The position illustrated by phantom lines in FIG. 4 is the observing position, where incident light is divided by the main mirror 211 into reflected light and passing light. The reflected light is directed upwards to a focusing screen, pentamirror, and finder (not shown). The passing light is reflected by the submirror 212 to an autofocus detection system (not shown). The quick return mirror moves to its photographing position when a release switch (not shown) is turned ON. To reach the photographing position, the main mirror 211 and submirror 212 are flipped up parallel to the focusing screen, and incident light passes to the shutter block 25. Subsequently, the shutter block 25 is activated to carry out the exposure onto a film.

As shown in FIGS. 4 and 6, aback lid 27 is closable to the rear of the camera. The back lid 27 has a peripheral upper rim 271 and lower rim 272. Grooves 23a and 23b are provided at the rear side of the camera body to accept the upper and lower rims 271 and 272 when the back lid 27 is shut, shielding the back of the camera 200 against the intrusion of light. As shown in FIG. 4, on the inner side of the back lid 27 (inside the camera 200 when the back lid 27 is closed), a pressing plate 28 is resiliently supported by supports 28a for pressing the film into a position against the inner rails 261a, 261b and between the outer rails 262a, 262b.

According to the embodiment of a camera 200, since the frame aperture 253a (for defining an exposable area of a frame of film) is formed in the shutter block 25, it is unnecessary to provide an additional defining frame aperture in the camera body 23, reducing the number of steps and components needed to manufacture the camera 200.

Furthermore, since the camera body 23 does not have to resist distorting forces to the extent of a conventional camera of the prior art camera body 23 can be made of plastic, or to form a lighter camera body 23 and camera 200 in general. More specifically, when external stress is applied to the supporting plate 22 or camera body 23, distortion due to this stress is transferred through the camera body 23, or through the mirror housing 24 via the supporting plate 22. However, as the aperture frame 253a, inner rails 261a, 261b and outer rails 262a, 262b are provided on the shutter block 25, the transmission of stress directly from the camera body 23 or supporting plate 22 is avoided.

In this case, as the mirror housing 24 is box shaped and thereby relatively strong, the distortion transferred to the mirror housing 24 does not substantially transmit to the shutter block 25. Furthermore, as at least one of the shutter frames 254 and 255 of the shutter block 25 is metal, it has a high strength and is not easily deformed. Accordingly, in comparison to a conventional camera 100, the aperture frame 253a, the inner rails 261a, 261b and the outer rails 262a, 262b are more difficult to deform (i.e., more resistant to deformation).

In one specific case, in order to mount the camera 200 onto a tripod (not shown), a stud provided on the tripod is engaged with the threaded tripod socket 215 of the supporting plate 22. The route for the transmission of stresses from the tripod mount 215 is through the supporting plate 22, mirror housing 24, and shutter block 25 to the rails 261a, 261b, 262a, and 262b. Accordingly, when the camera 200 is attached to a tripod, even if the tripod stud is overtightened or other forces are applied therefrom, the aperture frame 253a and the inner and outer rails 261a, 261b, 262a, and 262b are relatively isolated from the distorting stresses. Since the dimensions of the film guiding portions are therefore stable, it is always possible to properly position and guide the film.

It should be noted that in this particular embodiment, the shutter block 25 (bearing the film guiding rails and frame aperture 253a) is preferably fixed to the mirror housing 24. However, if the shutter block 25 is instead fixed to the camera body 23, resistance to distortion of the frame aperture 253a and the rails 261a, 261b, 262a, and 262b to external stresses remains higher than that of the conventional camera, as the route for transmission of stresses is less direct.

What is claimed is:

1. A camera, comprising:
   a camera body having a plate extending between a film cartridge chamber and a spool chamber, said plate having an opening formed therein;
   a mirror housing for supporting a swingable mirror, said mirror housing being secured to said camera body;
   a shutter block having a frame aperture formed therein for defining an exposable area of a frame of film and at least one pair of guide rails for positioning said film, said shutter block being secured to one of said mirror housing and said camera body; and
   said frame aperture and said guide rails being positioned within said opening formed in said plate.

2. The camera according to claim 1,
   wherein said shutter block is secured to said mirror housing.

3. The camera according to claim 1,
   wherein said camera body is formed from plastic resin.

4. The camera according to claim 1,
   wherein said at least one pair of film guide rails further comprises:
   an inner pair of film guide rails for flattening said film; and
   an outer pair of film guide rails for guiding said film therebetween.

5. The camera according to claim 1, further comprising:
   a supporting plate secured to both said camera body and said mirror housing.

6. The camera according to claim 5,
   wherein said supporting plate has a threaded tripod socket formed therein for attaching a tripod to said camera.

7. The camera according to claim 1,
   wherein said shutter block comprises:
   a front frame plate;
   a rear frame plate;
   a shutter blade chamber disposed between said front and rear frame plate; and
   a plurality of shutter blades supported in said shutter blade chamber, and
   wherein at least one of said front and rear plates is metal.

8. The camera according to claim 7,
   wherein at least one pair of film guide rails is formed on a film guiding plate extending from said rear frame plate, and said film guiding plate extends into said opening of said camera body.

9. A camera, comprising:
   a camera body having a rear plate extending between a film cartridge chamber and a spool chamber, said rear plate having an opening formed therein;
   a focal plane shutter block having a film guiding plate extending into said opening, said film guiding plate being substantially the same size as said opening and having a surface substantially flush with said rear plate; and
   said film guiding plate comprising:
   a frame aperture for defining an exposable area of a frame of film;
   an inner pair of guide rails for flattening a film inserted in said camera; and
   an outer pair of guide rails for guiding said film therebetween.

10. The camera according to claim 9,
    wherein said camera body is formed from plastic resin.

11. The camera according to claim 9, wherein said focal plane shutter block further comprises:
    a front frame plate;
    a rear frame plate upon which said film guiding plate is formed;
    a shutter blade chamber disposed between said front and rear frame plate; and
    a plurality of shutter blades supported in said shutter blade chamber, and
    wherein at least one of said front and rear plates is metal.

12. The camera according to claim 9, further comprising:
    a mirror housing for supporting a swingable mirror, said mirror housing being secured to said camera body, and said focal plane shutter block being secured to said mirror housing.

13. The camera according to claim 12, further comprising:
    a supporting plate secured to said camera body, said mirror housing being secured to said supporting plate, and said supporting plate having a threaded tripod socket formed therein for attaching a tripod to said camera.

14. A focal plane shutter block for a camera, comprising:
a focal plane shutter; and
a rear frame plate upon which a film guiding plate is formed;
said film guiding plate comprising:
an inner pair of guide rails extending in a direction of film travel past said shutter block, contacting a face of said film and flattening said film;
an outer pair of guide rails extending in a direction of film travel past said shutter block, contacting edges of said film and guiding said film therebetween; and
a frame aperture, formed in said film guiding plate between said inner pair of guide rails, defining a largest exposable area of a frame of film used in said camera.

15. The camera according to claim 14, further comprising:
means for attaching said focal plane shutter block to a mirror housing for supporting a swingable mirror of said camera.

16. The camera according to claim 14, further comprising:
a front frame plate, at least one of said front and rear plates being formed from metal.

17. A camera, comprising:
a camera body having a plate extending between a film cartridge chamber and a spool chamber, said plate having an opening formed therein;
a shutter block having a frame aperture formed therein defining an exposable area of a frame of film, and at least one pair of guide rails for positioning said film, said shutter block being secured with respect to said camera body; and said frame aperture and said guide rails being positioned within said opening formed in said plate.

18. The camera according to claim 17,
wherein said camera body is formed from plastic resin.

19. The camera according to claim 17, wherein said at least one pair of film guide rails further comprises:
an inner pair of film guide rails for flattening said film; and
an outer pair of film guide rails for guiding said film therebetween.

20. The camera according to claim 17,
wherein said shutter block comprises:
a front frame plate;
a rear frame plate;
a shutter blade chamber between said front and rear frame plate; and
a plurality of shutter blades supported in said shutter blade chamber, and
wherein at least one of said front and rear plates is metal.

21. The camera according to claim 20,
wherein said at least one pair of film guide rails is formed on a film guiding plate extending from said rear frame plate, and said film guiding plate extends into said opening of said camera body.

22. The camera according to claim 17, further comprising:
a mirror housing for supporting a swingable mirror, said mirror housing being secured to said camera body.

23. The camera according to claim 22,
wherein said shutter block is secured to said mirror housing.

24. The camera according to claim 22, further comprising:
a supporting plate secured to both said camera body and said mirror housing.

25. The camera according to claim 24,
wherein said supporting plate has a threaded tripod socket formed therein for attaching a tripod to said camera.

* * * * *